(12) United States Patent
Wolf

(10) Patent No.: US 9,738,330 B2
(45) Date of Patent: Aug. 22, 2017

(54) AIR GUIDING DEVICE AND METHOD FOR OPERATING THE SAME

(71) Applicant: Dr. Ing. h.c. F. Porsche Aktiengesellschaft, Stuttgart (DE)

(72) Inventor: Thomas Wolf, Leonberg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 15/053,364

(22) Filed: Feb. 25, 2016

(65) Prior Publication Data

US 2016/0251041 A1 Sep. 1, 2016

(30) Foreign Application Priority Data

Feb. 26, 2015 (DE) .......................... 10 2015 102 741

(51) Int. Cl.
*B62D 35/00* (2006.01)
*B60L 8/00* (2006.01)
(Continued)

(52) U.S. Cl.
CPC ............ *B62D 35/007* (2013.01); *B60L 8/006* (2013.01); *B62D 37/02* (2013.01); *F04D 17/04* (2013.01);
(Continued)

(58) Field of Classification Search
CPC ... B60K 16/00; B60K 2016/006; B60L 8/006; B62D 35/007; B62D 37/02; F04D 17/04;
(Continued)

(56) References Cited

U.S. PATENT DOCUMENTS

| 4,141,425 A | * | 2/1979 | Treat | ...................... B60K 16/00 |
| | | | | 136/291 |
| 4,810,022 A | * | 3/1989 | Takagi | ................. B62D 35/005 |
| | | | | 180/197 |

(Continued)

FOREIGN PATENT DOCUMENTS

| DE | 3019150 | 11/1981 |
| DE | 4305090 | 8/1994 |

(Continued)

*Primary Examiner* — Glenn Dayoan
*Assistant Examiner* — Paul Chenevert
(74) *Attorney, Agent, or Firm* — RatnerPrestia

(57) ABSTRACT

An air-guiding device which is arranged in a top rear region of a vehicle and includes an air-guiding element which is shiftable from a retracted inoperative position to an extended operating position, wherein, in both positions, the air-guiding element serves for guiding air in the rear region of the motor vehicle. At least one propeller of the air-guiding device which, together with the air-guiding element, is shiftable between the retracted and extended positions, wherein the propeller, in the extended operating position, is fixable in a first operating state, wherein the at least one propeller, in the extended operating position, is operable in a second operating state in order to produce a throughflow in the direction of travel, and wherein the at least one propeller, in the extended operating position, is operable in a third operating state in order to produce a throughflow opposed to the direction of travel.

9 Claims, 2 Drawing Sheets

(51) Int. Cl.
  *B62D 37/02* (2006.01)
  *F04D 17/04* (2006.01)
  *F04D 19/00* (2006.01)
  *F04D 25/16* (2006.01)
  *B60K 16/00* (2006.01)

(52) U.S. Cl.
  CPC ............ *F04D 19/002* (2013.01); *F04D 25/16* (2013.01); *F04D 25/166* (2013.01); *B60K 16/00* (2013.01); *B60K 2016/006* (2013.01)

(58) Field of Classification Search
  CPC ...... F04D 19/002; F04D 19/005; F04D 25/16; F04D 25/166
  See application file for complete search history.

(56) References Cited

U.S. PATENT DOCUMENTS

| | | | | |
|---|---|---|---|---|
| 4,917,434 A * | 4/1990 | Sumitani | ................ | B62D 37/02 105/1.2 |
| 5,287,004 A * | 2/1994 | Finley | ................ | B60K 16/00 180/2.2 |
| 5,920,127 A * | 7/1999 | Damron | ................ | B60K 16/00 180/65.31 |
| 6,838,782 B2 * | 1/2005 | Vu | ................ | B60K 6/48 290/44 |
| 6,897,575 B1 * | 5/2005 | Yu | ................ | B60K 16/00 180/65.265 |
| 7,175,229 B2 | 2/2007 | Garcia | | |
| 7,338,257 B2 * | 3/2008 | Allaire | ................ | B60K 16/00 416/142 |
| 7,481,482 B2 * | 1/2009 | Grave | ................ | B62D 35/007 296/180.1 |
| 7,695,050 B2 * | 4/2010 | Neale | ................ | B62D 35/00 180/903 |
| 7,802,641 B2 * | 9/2010 | Friedmann | ............ | B60K 16/00 180/2.1 |
| 7,808,121 B1 * | 10/2010 | Glynn | ................ | F03D 13/20 290/1 R |
| 7,868,476 B2 * | 1/2011 | Baca | ................ | B60K 6/485 290/55 |
| 8,067,852 B2 * | 11/2011 | Ortiz | ................ | B60K 6/485 290/55 |
| 8,113,571 B2 * | 2/2012 | Goenueldinc | ........ | B62D 35/007 296/180.1 |
| 8,584,778 B2 * | 11/2013 | Wolf | ................ | B60K 11/04 180/68.1 |
| 8,967,302 B2 * | 3/2015 | Tran | ................ | B60K 16/00 180/2.2 |
| 9,022,150 B2 * | 5/2015 | Cunico | ................ | B60L 8/006 180/2.1 |
| 2002/0067049 A1 * | 6/2002 | Pettey | ................ | B62D 35/007 296/180.5 |
| 2002/0153178 A1 * | 10/2002 | Limonius | ................ | B60L 8/006 180/2.2 |
| 2003/0090126 A1 * | 5/2003 | Adams | ................ | B62D 35/007 296/180.1 |
| 2005/0029835 A1 * | 2/2005 | Adams | ................ | B62D 35/007 296/180.1 |
| 2005/0210858 A1 * | 9/2005 | Gore | ................ | B60K 16/00 60/201 |
| 2008/0061596 A1 * | 3/2008 | Brown | ................ | B60T 1/16 296/180.1 |
| 2008/0150321 A1 * | 6/2008 | Neale | ................ | B62D 35/00 296/180.1 |
| 2008/0286102 A1 * | 11/2008 | Tomoyasu | ............ | B60K 16/00 416/55 |
| 2009/0146452 A1 * | 6/2009 | Kjellgren | ................ | B62D 35/00 296/180.1 |
| 2009/0314567 A1 * | 12/2009 | Harrington | ............ | B60K 6/48 180/165 |
| 2011/0031043 A1 * | 2/2011 | Armani | ................ | F03D 9/00 180/2.2 |
| 2012/0085587 A1 * | 4/2012 | Drouin | ................ | B60K 16/00 180/2.2 |
| 2013/0106135 A1 * | 5/2013 | Praskovsky | .......... | B62D 35/001 296/180.1 |
| 2013/0168962 A1 * | 7/2013 | Bruno | ................ | B60L 8/006 290/44 |
| 2013/0263911 A1 * | 10/2013 | Bryson | ................ | B60L 8/003 136/244 |

FOREIGN PATENT DOCUMENTS

DE   102007058368 A1 *  7/2009  ........... B62D 35/007
JP       2000013906 A *  1/2000  ............. B60L 8/006

* cited by examiner

AIR GUIDING DEVICE AND METHOD FOR OPERATING THE SAME

CROSS-REFERENCE TO RELATED APPLICATIONS

This application claims priority to German Patent Application No. 10 2015 102 741.0, filed Feb. 26, 2015, which is incorporated by reference herein in its entirety.

FIELD OF THE INVENTION

The invention relates to an air-guiding device of a motor vehicle and to a method for operating said air-guiding device.

BACKGROUND OF THE INVENTION

Air-guiding devices of a motor vehicle have at least one air-guiding element. A fundamental distinction is made here between air-guiding devices with fixed air-guiding elements and air-guiding devices with air-guiding elements which are shiftable between an extended operating position and a retracted inoperative position.

DE 30 19 150 A1, which is incorporated by reference herein, and DE 43 05 090 A1, which is incorporated by reference herein, both disclose an air-guiding device for a vehicle, which is arranged in a top rear region of the vehicle and comprises an air-guiding element which is shiftable from a retracted inoperative position, in which said air-guiding element is integrated in a surface-flush manner into the shape profile of the rear region, into an extended operating position, and conversely from the operating position into the inoperative position. The air-guiding element is designed as a supporting wing which is shiftable or transferable by means of an actuating device from the inoperative position into the operating position and vice versa. With said air-guiding devices, the coefficient of rear-axle downforce can be increased while the coefficient of drag remains the same or else is reduced.

U.S. Pat. No. 7,175,229 B2, which is incorporated by reference herein, discloses an air-guiding device of a motor vehicle with a fixed air-guiding element, wherein said fixed air-guiding element is assigned a propeller which is driven by the relative wind as the vehicle is moving.

SUMMARY OF THE INVENTION

Disclosed herein is an air-guiding device that useable with great versatility and has a shiftable air-guiding element, as well as a method for operating said air-guiding device.

According to aspects of the invention, the air-guiding element is assigned at least one propeller which, together with the air-guiding element, is shiftable between the retracted inoperative position and the extended operating position, wherein the or each propeller, in the extended operating position, is fixable in a first operating state, wherein the or each propeller, in the extended operating position, is operable in a second operating state in order to produce a throughflow in the direction of travel, and wherein the or each propeller, in the extended operating position, is operable in a third operating state in order to produce a throughflow opposed to the direction of travel.

The air-guiding device of a motor vehicle includes an air-guiding element which is shiftable between an extended operating position and a retracted inoperative position, wherein, in the retracted inoperative position, the air-guiding element of the air-guiding device is integrated in a surface-flush manner into the shape profile of the rear region of the motor vehicle. According to aspects of the invention, the air-guiding element of such an air-guiding device is assigned at least one propeller which, together with the air-guiding element, is shiftable between the retracted inoperative position and the extended operating position. In the extended operating position, the or each propeller can be operated in different operating states in order to produce electrical energy and/or in order to influence the drag and/or rear-axle downforce of the vehicle.

The air-guiding device permits a comprehensive or versatile use of the or each propeller, which is shiftable together with the air-guiding element, of the air-guiding device in order to produce electrical energy and/or in order to influence the drag value and/or in order to influence the rear-axle downforce of the vehicle.

Preferably, whenever the or each propeller, in the extended operating position of the air-guiding element, is fixed in the first operating state, a drag of the vehicle is reduced and/or a rear-axle downforce of the vehicle is increased in comparison to the retracted inoperative position. Whenever the or each propeller, in the extended operating position, is operated in the second operating state, the drag of the vehicle is further reduced and/or the rear-axle downforce of the vehicle is further increased in comparison to the first operating state in the extended operating position. Whenever the or each propeller, in the extended operating position, is operated in the third operating state, the drag of the vehicle is increased and/or the rear-axle downforce of the vehicle is reduced in comparison to the first operating state in the extended operating position. This permits a comprehensive or versatile use of the or each propeller, which is shiftable together with the air-guiding element, of the air-guiding device in order to produce electrical energy and/or in order to influence the drag value of the vehicle and/or in order to influence the rear-axle downforce of the vehicle.

The or each propeller, in the extended operating position, is preferably operated as a generator in the second operating state, and, in the extended operating position, is operated as a motor in the third operating state.

Also disclosed herein is a method for operating the air-guiding device.

BRIEF DESCRIPTION OF THE DRAWINGS

Preferred developments of the invention emerge from the dependent claims and from the description below. Exemplary embodiments of the invention, without being restricted thereto, are explained in more detail with reference to the drawing, in which:

DETAILED DESCRIPTION OF THE INVENTION

The air-guiding device of a motor vehicle is arranged in a top rear region of the vehicle and comprises a shiftable air-guiding element.

Figure 1:
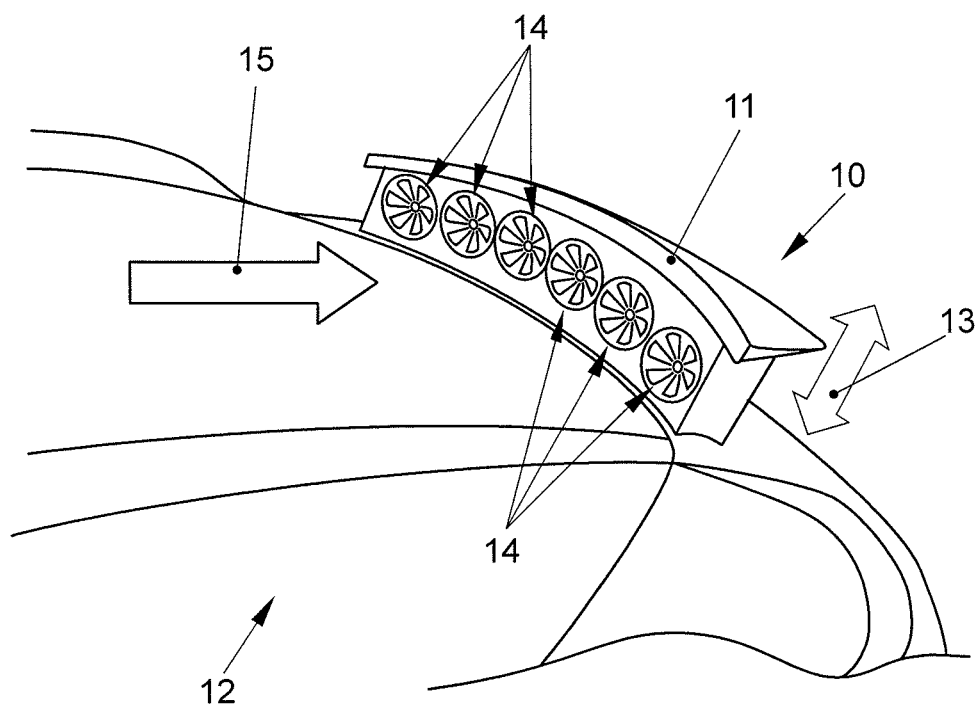
FIG. 1 shows a detail from a rear region of a motor vehicle with a first air-guiding device according to aspects of the invention in an extended operating position.

FIG. 1 shows a first exemplary embodiment of an air-guiding device 10 according to aspects of the invention with a shiftable air-guiding element 11, wherein the air-guiding device 10 is arranged in a top rear region 12 of the motor vehicle. The air-guiding element 11 of the air-guiding device 10 is shiftable between a retracted inoperative position and an extended operating position, namely, in FIG. 1, in the direction of the arrow 13 shown there, wherein, in the retracted inoperative position, the air-guiding element 11 is integrated in a surface-flush manner into the shape profile of the rear region 12 of the motor vehicle.

Both in the retracted inoperative position and in the extended operating position, the air-guiding element 11 of the air-guiding device 10 serves for conducting an air stream in the rear region of the motor vehicle.

Within the meaning of the invention present here, the air-guiding element 11 of the air-guiding device 10, which air-guiding element is shiftable between the retracted inoperative position and the extended operating position, is assigned at least one propeller 14.

In the exemplary embodiment of FIG. 1, the air-guiding element 11 is assigned a plurality of propellers 14, namely a total of six propellers 14, which are embodied as axial turbines or axial propellers.

The propellers 14, together with the air-guiding element 11, are shiftable between the extended operating position and the retracted inoperative position.

In the exemplary embodiment of FIG. 1, the propellers 14, in the extended operating position shown in FIG. 1, are operable in different operating states. Thus, in a first operating state of the extended operating position, the propellers 14 can be fixed in the extended operating position. In the extended operating position, the propellers 14 can be operated in a second operating state in order to produce a throughflow in the direction of travel of the vehicle. The flow direction is illustrated in FIG. 1 by means of an arrow 15. Furthermore, it is possible for the propellers 14, in the extended operating position, to be operated in a third operating state in which said propellers serve for producing a throughflow opposed to the direction of travel.

Whenever the propellers 14 of the air-guiding device 10 of FIG. 1, in the extended operating position of the air-guiding element 11 in FIG. 1, are fixed in the first operating state, a drag value of the motor vehicle is reduced and a rear-axle downforce of the vehicle or a coefficient of rear-axle downforce is increased, to be precise in comparison to the retracted inoperative position of the air-guiding device 10.

Whenever the propellers 14, in the extended operating position, are operated in the second operating state in which said propellers produce a throughflow in the flow direction (i.e. (in) the direction of travel) or with the wind direction, the drag value is further reduced and the coefficient of rear-axle downforce or the rear-axle downforce is further increased in comparison to the first operating state of the extended operating position. In the second operating state in the extended operating position, the propellers 14 are then operated in a "tension direction", and a buildup of pressure upstream of the air-guiding device 10 drops. The propellers 14 can be used in this case in the generator mode of same to produce electrical energy and to charge an electrical energy accumulator.

Whenever the propellers 14, in the extended operating position, are operated in the third operating state in which said propellers produce a throughflow counter to the direction of travel, the drag of the vehicle is increased and the rear-axle downforce of the vehicle or the coefficient of rear-axle downforce is reduced in comparison to the first operating state. In the third operating state in the extended operating position, the propellers 14 are operated in the "pressure direction", and a greater buildup of pressure is produced upstream of the air-guiding device 10 than in the first operating state in the extended operating position. The propellers 14 are preferably driven here as a motor.

Figure 2:
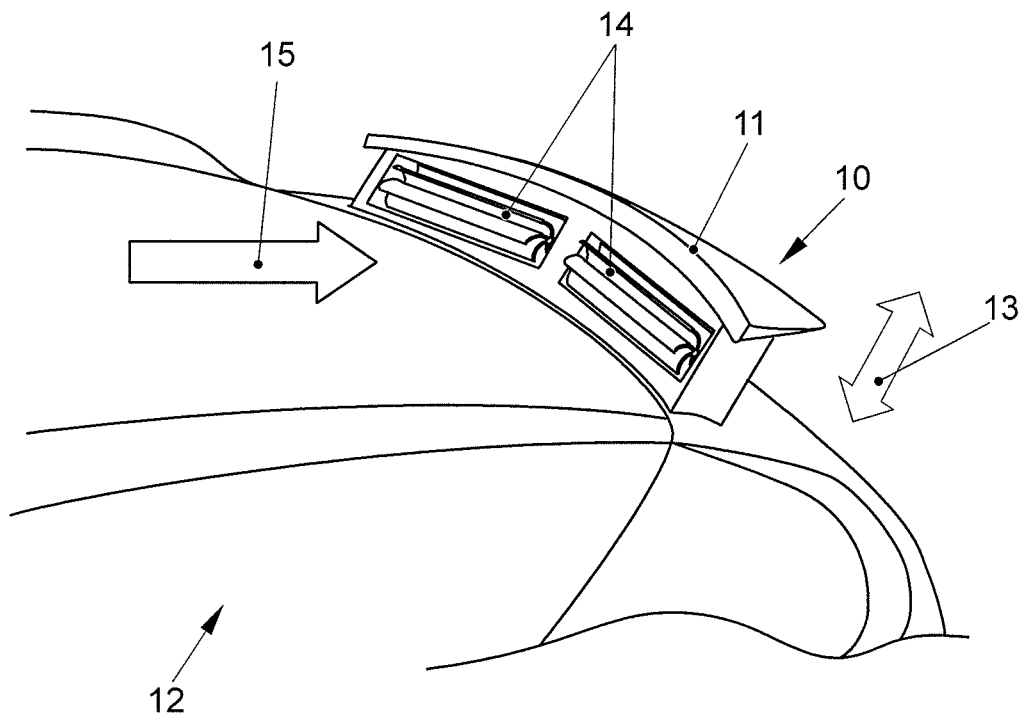
FIG. 2 shows a detail from a rear region of a motor vehicle with a second air-guiding device according to aspects of the invention in an extended operating position.

FIG. 2 shows a further exemplary embodiment of an air-guiding device 10 according to aspects of the invention which only differs from the exemplary embodiment of FIG. 1 in that the propellers 14 assigned to the shiftable air-guiding element 11 are not embodied as axial propellers, but on the contrary as radial propellers or radial turbines.

Figure 3:
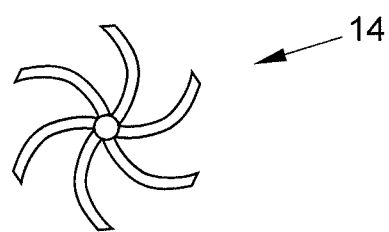
FIG. 3 shows a radial propeller of the air-guiding device.

FIG. 3 shows a radial propeller 14 of this type in longitudinal section. In the case of the axial propellers 14 of FIG. 1, the axes of rotation of same run substantially in the direction of travel or the throughflow direction of same. In the case of the radial propellers 14 of FIGS. 2 and 3, the axes of rotation of same run substantially transversely with respect to the direction of travel and therefore in the throughflow direction of same.

With the air-guiding device 10 according to aspects of the invention, it is accordingly possible, in the extended operating position of the air-guiding element 10 and therefore in the extended operating position of the propellers 14 which are shiftable together with the air-guiding element 11, firstly to influence the drag of the motor vehicle in a targeted manner and secondly to provide downforce to a greater or lesser degree at the rear axle of the motor vehicle.

Accordingly, it is within the meaning of the invention present here to propose an air-guiding device 10 of a vehicle, which has an air-guiding element 11 which is shiftable between the retracted inoperative position and the extended operating position, wherein, in the retracted inoperative position, the air-guiding element 11 is integrated in a surface-flush manner into the shape profile of the rear region of the motor vehicle.

The shiftable air-guiding element 11 is assigned propellers 14 which are shiftable together therewith and, in the extended operating position, can be operated in different operating states, namely in a first operating state of the extended operating position, in which said propellers are fixed and accordingly do not rotate, in a second operating state of the extended operating position, in which said propellers produce a throughflow in the direction of travel, and in a third operating state of the extended operating position, in which said propellers provide a throughflow opposed to the direction of travel. Via said operating states in the extended operating position of the air-guiding device, the drag and the rear-axle downforce, and therefore the aerodynamic properties of the vehicle, can be advantageously influenced; furthermore, electrical energy can optionally be produced.

What is claimed is:
1. An air-guiding device for a passenger vehicle, and which is arranged in a top rear region of the vehicle, comprises:
   an air-guiding element which is shiftable from a retracted inoperative position, in which the air-guiding element is integrated in a surface-flush manner into a shape profile of the rear region, into an extended operating position,
   wherein, both in the retracted inoperative position and in the extended operating position, the air-guiding element serves for guiding air in the rear region of the motor vehicle,
   wherein the air-guiding element is assigned at least one propeller which, together with the air-guiding element, is shiftable between the retracted inoperative position and the extended operating position, wherein the or each propeller, in the extended operating position, is fixable in a first operating state, wherein the or each propeller, in the extended operating position, is operable in a second operating state in order to produce a throughflow in the direction of travel, and wherein the or each propeller, in the extended operating position, is operable in a third operating state in order to produce a throughflow opposed to the direction of travel.

2. The air-guiding device as claimed in claim 1, wherein whenever the or each propeller, in the extended operating position of the air-guiding element, is fixed in the first operating state, a drag of the vehicle is reduced and a rear-axle downforce of the vehicle is increased in comparison to the retracted inoperative position.

3. The air-guiding device as claimed in claim 1, wherein whenever the or each propeller, in the extended operating position, is operated in the second operating state, a drag of the vehicle is further reduced and a rear-axle downforce of the vehicle is further increased in comparison to the first operating state.

4. The air-guiding device as claimed in claim 1, wherein whenever the or each propeller, in the extended operating position, is operated in the third operating state, a drag of the vehicle is increased and a rear-axle downforce of the vehicle is reduced in comparison to the first operating state.

5. The air-guiding device as claimed in claim 1, wherein the or each propeller, in the extended operating position, is operated as a generator in the second operating state.

6. The air-guiding device as claimed in claim 1, wherein the or each propeller, in the extended operating position, is operated as a motor in the third operating state.

7. The air-guiding device as claimed in claim 1, wherein the or each propeller is embodied as an axial turbine.

8. The air-guiding device as claimed in claim 1, wherein the or each propeller is embodied as a radial turbine.

9. A method for operating the air-guiding device as claimed in claim 1, wherein whenever the or each propeller, in the extended operating position, is fixed in a first operating state, a drag of the vehicle is reduced and a rear-axle downforce of the vehicle is increased in comparison to the retracted inoperative position, whenever the or each propeller, in the extended operating position, is operated in a second operating state in order to produce a throughflow in the direction of travel, the drag of the vehicle is further reduced and the rear-axle downforce of the vehicle is further increased in comparison to the first operating state in the extended operating position, whenever the or each propeller, in the extended operating position, is operated in a third operating state in order to produce a throughflow counter to the direction of travel, the drag of the vehicle is increased and a rear-axle downforce of the vehicle is reduced in comparison to the first operating state in the extended operating position.

* * * * *